(12) United States Patent
Miyawaki

(10) Patent No.: US 8,412,446 B2
(45) Date of Patent: Apr. 2, 2013

(54) TRAVEL HISTORY COLLECTION SYSTEM AND TERMINAL SIDE DEVICE USED FOR IT

(75) Inventor: Osamu Miyawaki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1320 days.

(21) Appl. No.: 11/571,792

(22) PCT Filed: Jul. 1, 2005

(86) PCT No.: PCT/JP2005/012181
§ 371 (c)(1),
(2), (4) Date: Jan. 8, 2007

(87) PCT Pub. No.: WO2006/004029
PCT Pub. Date: Jan. 12, 2006

(65) Prior Publication Data
US 2008/0306678 A1 Dec. 11, 2008

(30) Foreign Application Priority Data

Jul. 7, 2004 (JP) .................................. 2004-200304

(51) Int. Cl.
G06F 19/00 (2006.01)
G06G 7/70 (2006.01)
G06G 7/76 (2006.01)
G08G 1/00 (2006.01)

(52) U.S. Cl. ...................................................... 701/118
(58) Field of Classification Search ......................... None
See application file for complete search history.

(56) References Cited

U.S. PATENT DOCUMENTS
5,777,580 A * 7/1998 Janky et al. ................... 342/457
6,012,012 A * 1/2000 Fleck et al. ................... 701/117
(Continued)

FOREIGN PATENT DOCUMENTS
JP 11-161894 6/1999
JP 2000-311286 11/2000
(Continued)

OTHER PUBLICATIONS

International Search Report for application No. PCT/JP2005/012181 dated Aug. 2, 2005.

(Continued)

Primary Examiner — Khoi Tran
Assistant Examiner — Nicholas Kiswanto
(74) Attorney, Agent, or Firm — RatnerPrestia

(57) ABSTRACT

A travel history collection system includes a terminal side device and a center side device capable of communicating with the terminal device. The terminal device includes the following components. A vehicle information acquisition part acquires a travel history of a vehicle. A short-range wireless communication means and a wide-range wireless communication means are used to transmit the acquired travel history to a center device. A travel history transmission part transmits the travel history to the center device via the short-range wireless communication means when the travel history can be transmitted via the short-range wireless communication means, and via the wide-range wireless communication means when the travel history cannot be transmitted via the short-range wireless communication means. The center device receives the travel history from the terminal device via the wide-range wireless communication antenna and the road side unit so as to reduce the load on wide-range wireless communication, and to accurately collect a travel history from each terminal device at real time. Thus, latest travel histories can be collected efficiently.

14 Claims, 9 Drawing Sheets

U.S. PATENT DOCUMENTS

| | | | |
|---|---|---|---|
| 6,055,426 A * | 4/2000 | Beasley | 455/432.1 |
| 6,542,808 B2 * | 4/2003 | Mintz | 701/117 |
| 7,463,955 B1 * | 12/2008 | Robinson et al. | 701/3 |
| 2001/0014847 A1 * | 8/2001 | Keenan | 701/117 |

FOREIGN PATENT DOCUMENTS

| | | |
|---|---|---|
| JP | 2000-311286 A | 11/2000 |
| JP | 2001-022988 | 1/2001 |
| JP | 2001-144814 | 5/2001 |
| JP | 2003-187396 A | 7/2003 |
| JP | 2003-247846 A | 9/2003 |
| JP | 2003-318809 | 11/2003 |
| JP | 2004-013199 | 1/2004 |

OTHER PUBLICATIONS

JP Office Action for 2004-200304, Jun. 29, 2010.

* cited by examiner

TRAVEL HISTORY COLLECTION SYSTEM AND TERMINAL SIDE DEVICE USED FOR IT

THIS APPLICATION IS A U.S. NATIONAL PHASE APPLICATION OF PCT INTERNATIONAL APPLICATION PCT/JP2005/012181.

TECHNICAL FIELD

The present invention relates to a travel history collection system in which a terminal device mounted on a vehicle acquires a travel history of the vehicle and then transmits it to a center device via a wireless communication means, and the center device collects travel histories of vehicles. The present invention also relates to a terminal side device used for the system.

BACKGROUND ART

There is a known system as follows. A terminal device acquires a travel history of a vehicle on which it is mounted and then transmits the travel history to a center device via either a short-range wireless communication means used between the terminal device and a road side device or a wide-range wireless communication means such as a portable telephone. A center device collects travel histories of vehicles transmitted from terminal devices, thereby generating information such as traffic information and traffic congestion information based on the collected travel histories.

This type of system known so far includes the following.

Japanese Patent Unexamined Publication No. H11-161894 describes a traffic control system used by the police or other authorities. In this system, sensors are installed in the road to detect traffic information, whereas a center device collects the traffic information and analyzes the travel conditions of vehicles on the road network based on the collected traffic information.

This system, however, can acquire road traffic conditions only on the roads having the sensors installed therein and more specifically only on the points where the sensors are installed.

To overcome this problem, a newer technique is described in Japanese Patent Unexamined Publication No. 2000-311286. In this technique, a vehicle is mounted with a terminal device to acquire a travel history of the vehicle and transmits it to a center device. The center device receives travel histories from terminal devices and analyzes them to generate information such as traffic information and traffic congestion information.

The travel history acquired by a terminal device is transmitted to the center device via either a wide-range wireless communication means such as a portable telephone or a short-range wireless communication using an optical beacon or another road side device.

However, this conventional technique has the following problems. In the case of using a short-range wireless communication means between a vehicle and a road side device such as an optical beacon, a radio beacon, or DSRC, the road side device communicates with one vehicle at a time. This allows the communication network to have a light load, but the center device cannot receive a travel history of a vehicle unless the vehicle passes through the point where the road side device is installed.

In the case of using a wide-range wireless communication means such as a portable telephone or a digital MCA to collect a travel history of a vehicle, as the number of vehicles from which to collect travel histories increases, the communication network has a higher load, causing convergence and making it impossible to use the communication means.

In order to keep the road conditions analyzed by the center device up to date, travel histories of vehicles are required to be collected and updated at regular short intervals. This shortens the road section from which to collect a travel history of each vehicle within the collection interval. As a result, the number of vehicles required to collect the road conditions of the entire road network increases, thereby causing the communication network to have a heavy load.

The load of the communication network can be reduced by accumulating travel histories until a prescribed distance, a prescribed point, or a prescribed time period is reached and then transmitting them all at once to the center device. However, the longer a vehicle accumulates travel histories, the older the travel histories become depending on the travel route. This may cause the information of the congestion section collected by the center device to be too old to be practical.

The time elapsed from the generation of a travel history to the transmission of the travel history to the center device can be reduced as follows. In the case of using road side devices, the number of road side devices installed can be increased. In the case of using a wide-range wireless communication means, the amount of data of travel histories to be accumulated can be reduced so as to increase the frequency of transmitting the travel histories to the center device. However, the former approach requires time and cost to install the road side devices, and the latter approach results in an increase in the communication load on the wide-range wireless communication means.

SUMMARY OF THE INVENTION

The present invention, which has been developed in view of these conventional problems, provides a travel history collection system that can efficiently collect latest travel histories, and a terminal side device used for the system.

The travel history collection system of the present invention includes a terminal side device and a center side device capable of communicating with the terminal side device, wherein the terminal side device includes: a vehicle travel history acquisition means for acquiring a travel history of a vehicle; a first short-range wireless communication means and a first wide-range wireless communication means for transmitting the travel history thus acquired to the center side device; and a travel history transmission means for transmitting the travel history to the center side device via the first short-range wireless communication means when the travel history can be transmitted to the center side device via the first short-range wireless communication means, and via the first wide-range wireless communication means when the travel history cannot be transmitted to the center side device via the first short-range wireless communication means, and the center side device includes a second wide-range wireless communication means and a second short-range wireless communication means for receiving the travel history transmitted from the terminal side device.

This structure allows a travel history acquired by the terminal side device to be transmitted to the center side device via the first short-range wireless communication means when the first short-range wireless communication means can be used, and in the other cases, via the first wide-range wireless communication means. As a result, the travel history can be transmitted to the center side device from anywhere. Furthermore, the first short-range wireless communication means is used whenever it can be used so as to reduce the communication load on the first wide-range wireless communication means. This structure also allows the travel history to be transmitted at a comparatively early stage and the center side device to receive travel histories efficiently, thereby arbitrarily generating traffic information.

In the travel history collection system of the present invention, the terminal side device further includes: a congestion section detection means for detecting a congestion section of the vehicle based on the travel history, and when the congestion section detection means detects the congestion section, the travel history transmission means transmits the travel history containing the congestion section to the center side device via one of the first wide-range wireless communication means and the first short-range wireless communication means.

In this structure, the travel history containing this section is transmitted to the center side device immediately after a congestion section is detected. As a result, the center side device can collect real-time traffic congestion information.

In the travel history collection system of the present invention, the travel history transmission means transmits the travel history containing the congestion section to the center side device via one of the first wide-range wireless communication means and the first short-range wireless communication means not immediately after the congestion section detection means detects the congestion section but after the vehicle travels a predetermined distance after the congestion section detection means detects the congestion section.

In this structure, travel information is not transmitted immediately after a congestion section is detected but instead accumulated until the vehicle travels a certain distance. The travel histories are transmitted all at once when the vehicle has traveled the certain distance so as to reduce the number of transmission, thereby reducing the communication load. Even if it cannot be used at the point of the detection of the congestion section, the first short-range wireless communication means may become able to be used while the vehicle is traveling the certain distance, thereby reducing the communication load on the wide-range wireless communication means.

In the travel history collection system of the present invention, the travel history transmission means transmits the travel history containing the congestion section to the center side device via one of the first wide-range wireless communication means and the first short-range wireless communication means not immediately after the congestion section detection means detects the congestion section but after a predetermined time period elapses after the congestion section detection means detects the congestion section.

In this structure, travel information is not transmitted immediately after a congestion section is detected but instead accumulated until a certain time period has elapsed. The travel histories are transmitted all at once when the certain time period has elapsed so as to reduce the number of transmission, thereby reducing the communication load. Even if it cannot be used at the point of the detection of the congestion section, the first short-range wireless communication means may become able to be used while the vehicle is traveling the certain distance, thereby reducing the communication load on the wide-range wireless communication means.

In the travel history collection system of the present invention, when the congestion section detection means detects the congestion section and then detects another congestion section while waiting for the vehicle to travel the predetermined distance, the travel history transmission means immediately transmits the travel history containing the congestion sections detected so far to the center side device via one of the first wide-range wireless communication means and the first short-range wireless communication means.

In this structure, when a new congestion section is detected after a previous congestion section is detected and waiting to be transmitted, the travel information containing the congestion sections detected so far is immediately transmitted. As a result, in the case where there are a number of congestion sections, travel history containing these congestion sections can be collected at real time.

In the travel history collection system of the present invention, when the congestion section detection means detects the congestion section and then detects another congestion section while waiting for the predetermined time period to elapse, the travel history transmission means immediately transmits the travel history containing the congestion sections detected so far to the center side device via one of the first wide-range wireless communication means and the first short-range wireless communication means.

In this structure, when a new congestion section is detected after a previous congestion section is detected and waiting to be transmitted, the travel information containing the congestion sections detected so far is immediately transmitted. As a result, in the case where there are a number of congestion sections, travel history containing these congestion sections can be collected at real time.

In the travel history collection system of the present invention, the congestion section detection means determines presence of congestion when a travel velocity of the vehicle remains not more than a predetermined threshold value for one of a predetermined distance and a predetermined time period.

In this structure, when the travel velocity of the vehicle becomes equal to or less than the threshold value under normal travel conditions such as right turns and left turns, this velocity reduction is not immediately considered to be congestion. This enables real congestion to be distinguished from these cases, thereby allowing the center side device to collect more accurate travel histories and hence to generate more accurate traffic information.

In the travel history collection system of the present invention, the congestion section detection means determines the presence of congestion when the average travel velocity of the vehicle in one of a certain fixed distance and a certain fixed time period is not more than a predetermined threshold value, even when the travel velocity does not remain not more than the predetermined threshold value for one of a predetermined distance and a predetermined time period, the certain fixed distance and the certain fixed time period being larger than the predetermined distance and the predetermined time period, respectively.

In this structure, the fluctuation of the travel velocity of the vehicle around the threshold value can be ignored, and instead the mean velocity can be calculated from a longer time period and a longer distance to determine the presence or absence of congestion. The detection of an accurate congestion section can be performed without being deceived by minor changes in the travel velocity.

In the travel history collection system of the present invention, the travel history transmission means transmits the travel history containing the congestion sections detected so far to the center side device via one of the first wide-range wireless communication means and the first short-range wireless communication means immediately after the congestion section reaches a predetermined allowable value.

In this structure, when the congestion section reaches a predetermined continuous allowable value, the travel history transmission means automatically transmits the travel history to the center side device. As a result, the center side device can collect travel histories at real time with a light communication load.

In the travel history collection system of the present invention, the travel history transmission means does not transmit the travel history containing the congestion sections detected so far to the center side device immediately after the congestion section reaches a predetermined allowable value, but waits for the travel history to become able to be transmitted via the first short-range wireless communication means and then transmits the travel history to the center device via the first short-range wireless communication means.

In this structure, the travel history containing the congestion sections detected so far is not transmitted to the center side device immediately after the congestion section reaches the predetermined continuous allowable value, but instead waits until it can be transmitted via the first short-range wireless communication means. As a result, although this compromises real-time performance, the first wide-range wireless communication means has a remarkably light communication load, and an accurate travel history can be collected via the first short-range wireless communication means.

As described above, the travel history collection system of the present invention can efficiently collect latest travel histories.

Figure 1:
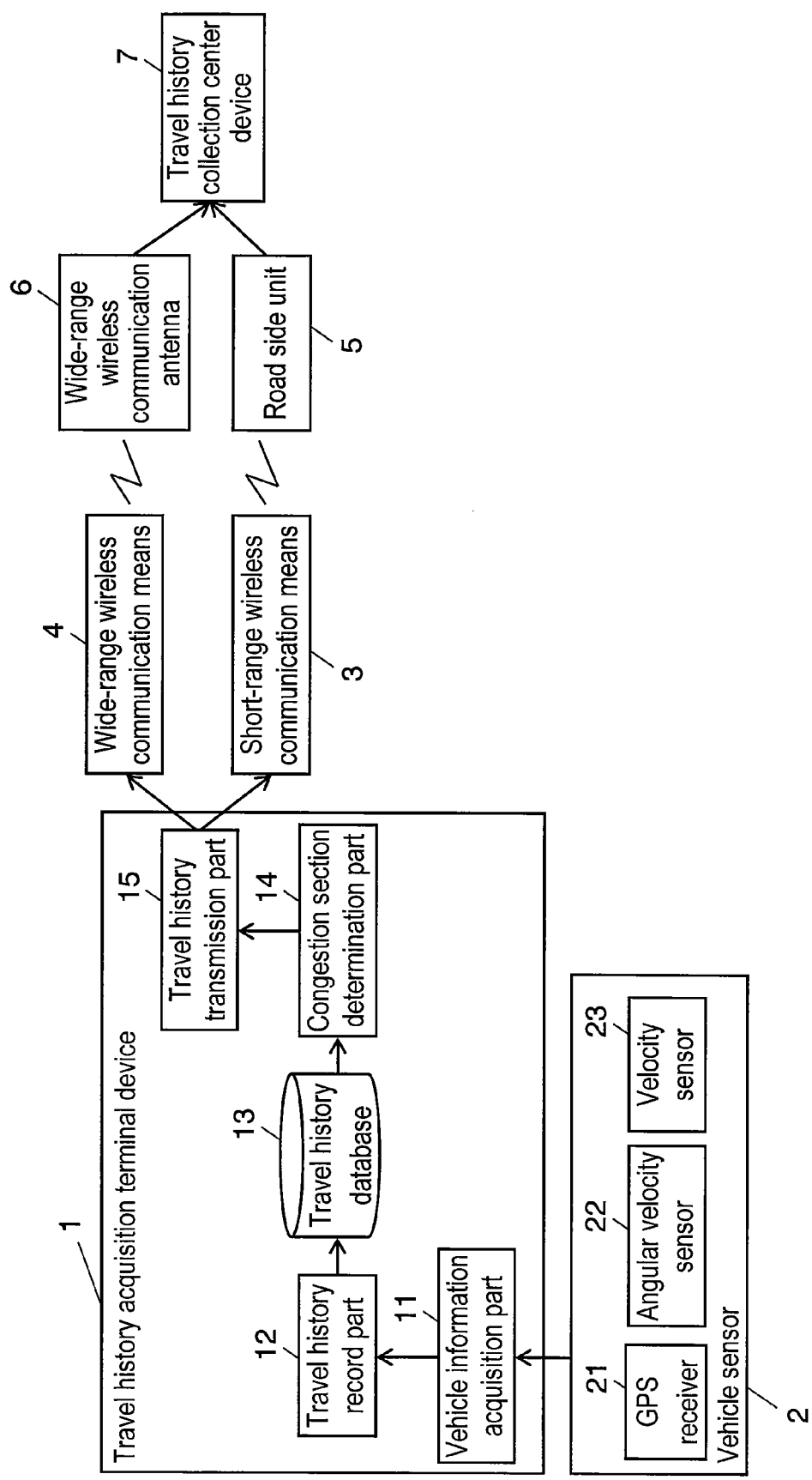
FIG. 1 is a block diagram showing a schematic structure of a travel history collection system of an embodiment of the present invention.
Figure 2:
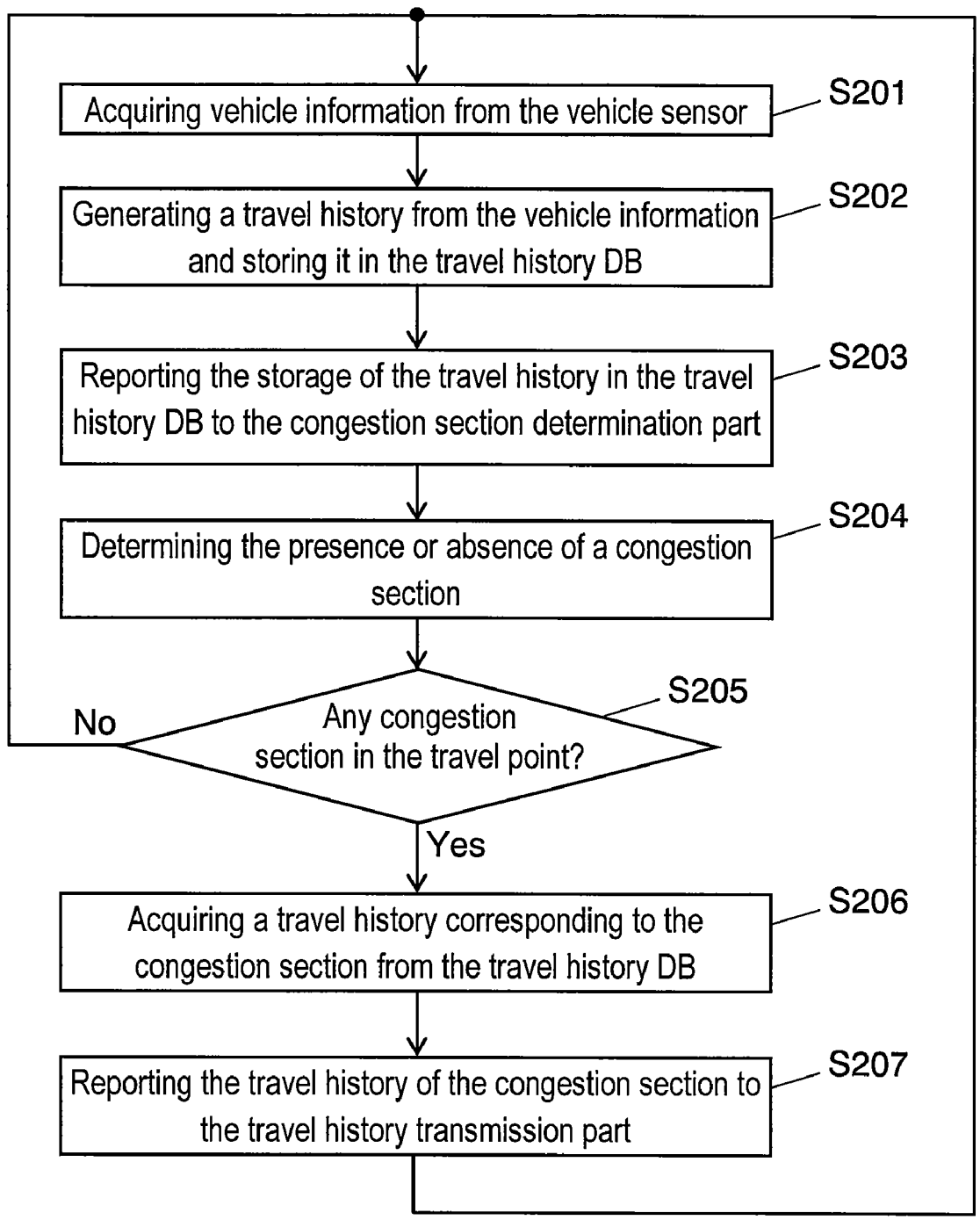
FIG. 2 is a first flowchart showing an operation of the travel history collection system of the embodiment of the present invention.

REFERENCE MARKS IN THE DRAWINGS 1 travel history acquisition terminal device
2 vehicle sensor
3 short-range wireless communication means
4 wide-range wireless communication means
5 road side unit
6 wide-range wireless communication antenna
7 travel history collection center device
11 vehicle information acquisition part
12 travel history record part
13 travel history database
14 congestion section determination part
15 travel history transmission part

DETAILED DESCRIPTION OF PREFERRED EMBODIMENT

A travel history collection system of an embodiment of the present invention will be described as follows with reference to drawings.

EXEMPLARY EMBODIMENT

FIG. 1 is a schematic block diagram showing a travel history collection system of an embodiment of the present invention.

In FIG. 1, travel history acquisition terminal device 1, vehicle sensor 2, short-range wireless communication means 3, and wide-range wireless communication means 4 are mounted on a vehicle from which a travel history is to be acquired.

In the present embodiment, a terminal side device is composed of travel history acquisition terminal device 1, vehicle sensor 2 short-range wireless communication means 3, and wide-range wireless communication means 4.

Travel history acquisition terminal device 1 includes vehicle information acquisition part 11, travel history record part 12, travel history database 13, and congestion section determination part 14. Vehicle information acquisition part 11, which is a vehicle travel history acquisition means, acquires the operating information of a vehicle detected by vehicle sensor 2. Travel history record part 12 generates a travel history from the vehicle information acquired by vehicle information acquisition part 11 and records it in travel history database 13. Travel history database 13 accumulates travel histories. Congestion section determination part 14 detects a congestion section from the travel histories.

Travel history acquisition terminal device 1 further includes travel history transmission part 15. Travel history transmission part 15 have the following functions: selecting between short-range wireless communication means 3 and wide-range wireless communication means 4 when a travel history contains a congestion section; generating transmission data from the travel history, the data being transmitted to travel history collection center device 7; and controlling short-range wireless communication means 3 and wide-range wireless communication means 4.

Vehicle sensor 2 includes GPS receiver 21 for determining the position of the vehicle using satellites, angular velocity sensor 22 for detecting a turning degree of the vehicle, and velocity sensor 23 for detecting the velocity of the vehicle. Thus, vehicle sensor 2 detects the position information, traveling direction, and velocity of the vehicle.

Short-range wireless communication means 3 performs data communication with a device installed in the road such as an optical beacon, an electric wave beacon, or DSRC via short-range wireless communication.

Wide-range wireless communication means 4 performs data communication with a wireless communication infrastructure such as a portable telephone or a digital MCA via wide-range wireless communication.

In the present embodiment, the center side device which collects travel histories is composed of road side unit 5, wide-range wireless communication antenna 6, and travel history collection center device 7.

Road side unit 5 performs data communication with short-range wireless communication means 3 mounted on the vehicle by short-range wireless communication.

Wide-range wireless communication antenna 6 performs data communication with wide-range wireless communication means 4 such as a portable telephone or a digital MCA mounted on the vehicle by wide-range wireless communication.

Travel history collection center device 7 receives the travel histories of one or more vehicles from one or more travel history acquisition terminal devices 1 either via short-range wireless communication means 3 and road side unit 5 or via wide-range wireless communication means 4 and wide-range wireless communication antenna 6. Travel history collection center device 7 then calculates road conditions of the road network, such as the time required for a vehicle to travel from one point to another and congestion conditions. The calculation is performed based on the position information, velocity information, traveling direction, and other information contained in the received travel histories. Travel history collection center device 7 also accumulates the road information such as the calculated time required for the travel and the congestion conditions for each time zone in which the appropriate road section and the travel history are detected by the terminal device.

The operation of the travel history collection system of the present embodiment will be described in detail as follows with reference to FIGS. 2 to 5.

FIGS. 2 to 5 are flowcharts showing the operation of the travel history collection system of the embodiment of the present invention.

Vehicle information acquisition part 11 acquires vehicle information such as the position coordinate, the velocity, and the traveling direction of the vehicle detected by vehicle sensor 2 (S201). The acquired vehicle information is provided to travel history database 13 via travel history record part 12. In travel history database 13, a travel history is generated from the vehicle information and stored (S202). The storage of the travel history in travel history database 13 is reported to congestion section determination part 14 (S203).

Congestion section determination part 14 determines the presence or absence of a congestion section from information such as the length of the section where the vehicle has traveled at low velocity and the traveling direction. Congestion section determination part 14 determines the presence or absence of the congestion section by referring to the travel histories within a certain fixed time period or a certain fixed travel distance in the latest travel histories recorded in travel history database 13 (S204).

Upon determining the presence of a congestion section ("Yes" at S205), congestion section determination part 14 acquires a travel history corresponding to the congestion section from travel history database 13 (S206), and transmits the travel history to travel history transmission part 15 (S207). After this, vehicle information acquisition part 11 again acquires latest vehicle information from vehicle sensor 2 (S201) and then the aforementioned operations are repeated.

On the other hand, when congestion section determination part 14 determines the absence of a congestion section ("No" at S205), vehicle information acquisition part 11 subsequently acquires latest vehicle information from vehicle sensor 2 (S201) and then the aforementioned operations are repeated.

Figure 3:
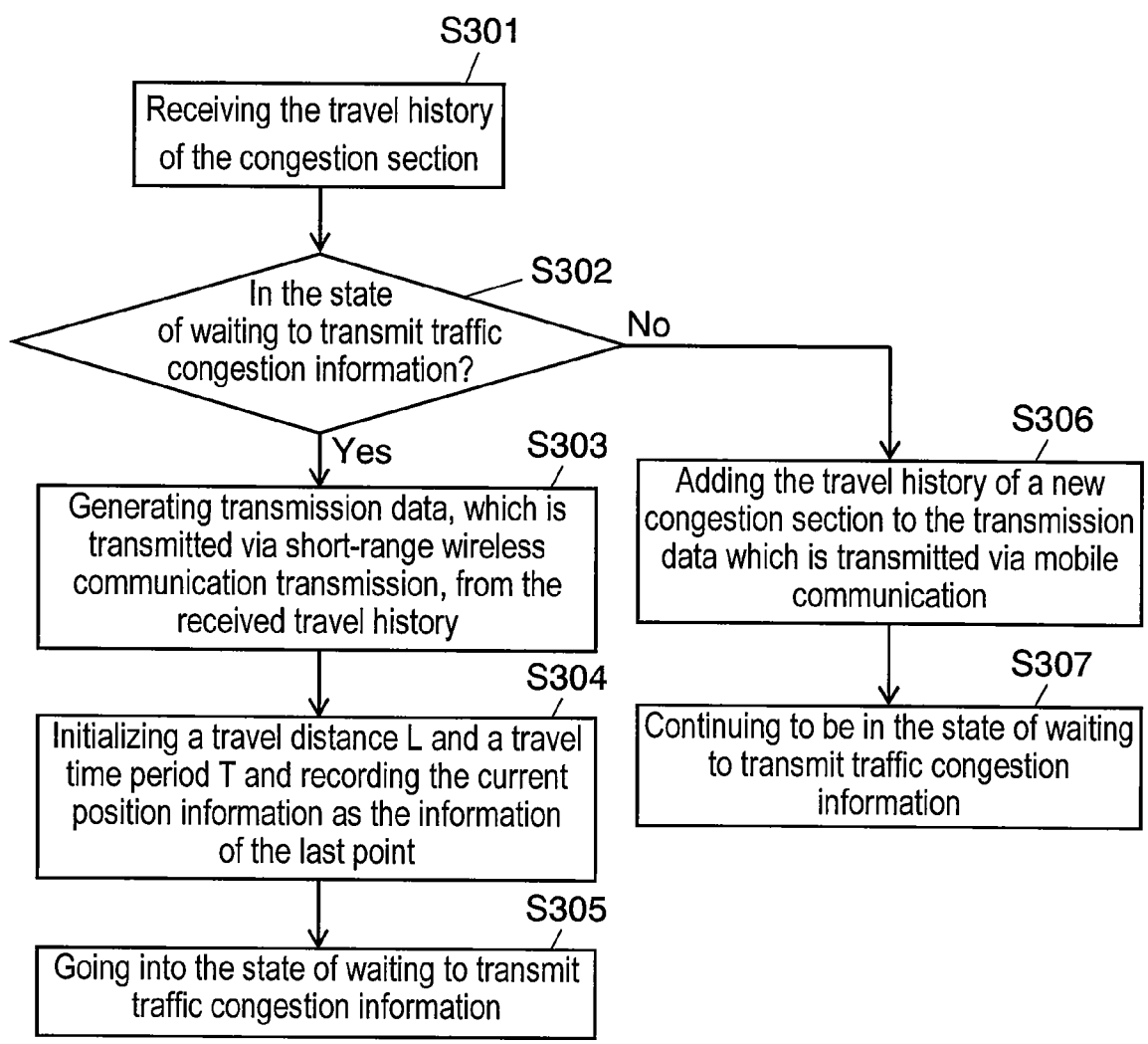
FIG. 3 is a second flowchart showing another operation of the travel history collection system of the embodiment of the present invention.

In FIG. 3, when acquiring the travel history corresponding to the congestion section from congestion section determination part 14 (S301), travel history transmission part 15 first determines whether it is in the state of waiting to transmit traffic congestion information (S302). When determined not in the state of waiting to transmit traffic congestion information ("No" at S302), travel history transmission part 15 acquires the travel history corresponding to the congestion section from travel history database 13. Travel history transmission part 15 then generates short-range wireless communication transmission data based on the acquired travel history (S303); records the latest position information as the information of the last point and initializes a travel distance L and a travel time period T starting from the congestion section determination point (S304); and goes into the state of waiting to transmit traffic congestion information (S305).

When determined to be in the state of waiting to transmit traffic congestion information ("Yes" at S302), travel history transmission part 15 acquires the travel history corresponding to a new congestion section from travel history database 13, and adds it to the already generated transmission data (the transmission data generated at Step 303) (S306). Thus, travel history transmission part 15 continues to be in the state of waiting to transmit traffic congestion information (S307).

Figure 4:
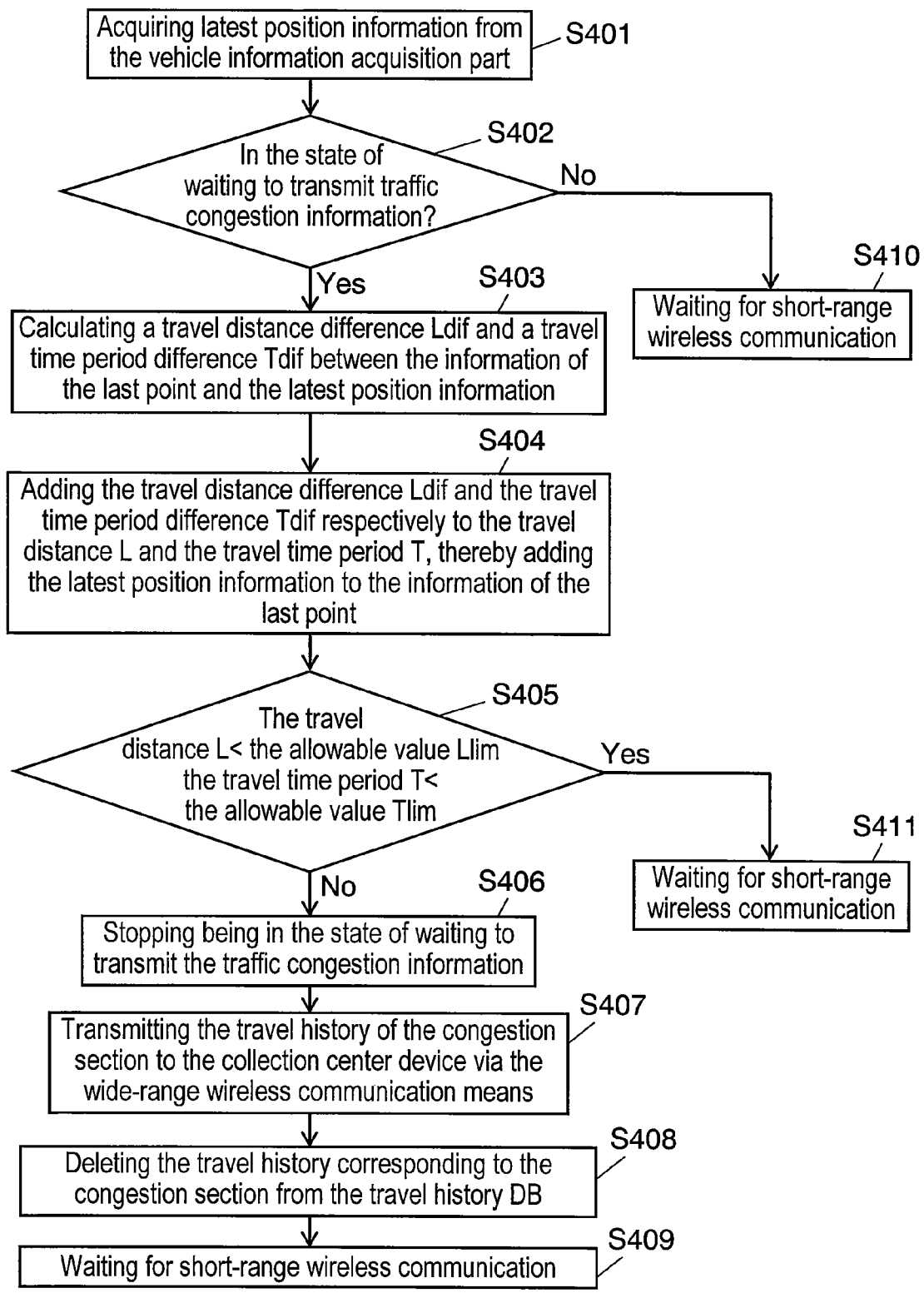
FIG. 4 is a third flowchart showing another operation of the travel history collection system of the embodiment of the present invention.

In FIG. 4, travel history transmission part 15 acquires latest position information from vehicle information acquisition part 11 (S401) and determines whether it is in the state of waiting to transmit traffic congestion information (S402). When not in the state of waiting to transmit traffic congestion information ("No" at S402), travel history transmission part 15 goes into the state of waiting for short-range wireless communication (S410). On the other hand, when in the state of waiting to transmit traffic congestion information ("Yes" at S402), travel history transmission part 15 compares between the latest position information and the information of the last point to calculate a travel distance difference Ldif and a travel time period difference Tdif (S403). The travel distance difference Ldif and the travel time period difference Tdif thus calculated are added respectively to the travel distance L and the travel time period T from the congestion section determination point, and the latest position information is recorded to the information of the last point and updated (S404).

Travel history transmission part 15 determines whether the travel distance L and travel time period T starting from the updated congestion section determination point are within allowable values Llim and Tlim, respectively (S405). When both the travel distance L and the travel time period T are within the allowable values Llim and Tlim ("Yes" at S405), travel history transmission part 15 goes into the state of waiting for short-range wireless communication (S411).

On the other hand, when at least one of the travel distance L and the travel time period T exceeds the allowable value Llim or Tlim ("No" at S405), travel history transmission part 15 stops being in the state of waiting to transmit the traffic congestion information (S406). Travel history transmission part 15 then transmits the transmission data generated from the travel history corresponding to the congestion section to travel history collection center device 7 via wide-range wireless communication means 4 and wide-range wireless communication antenna 6 (S407).

Upon transmitting the transmission data to travel history collection center device 7 via wide-range wireless communication means 4 (S407), travel history transmission part 15 deletes the transmitted travel history of the congestion section from travel history database 13 (S408), and goes into the state of waiting for short-range wireless communication (S409).

In this case, the allowable values Llim and Tlim are made negative so that travel history transmission part 15 can immediately transmit the travel history corresponding to the congestion section determined by congestion section determination part 14 to travel history collection center device 7 via wide-range wireless communication means 4.

When the allowable values Llim and Tlim are made positive, travel history transmission part 15 is temporarily put in the state of waiting to transmit the travel history corresponding to the congestion section determined by congestion section determination part 14.

Figure 5:
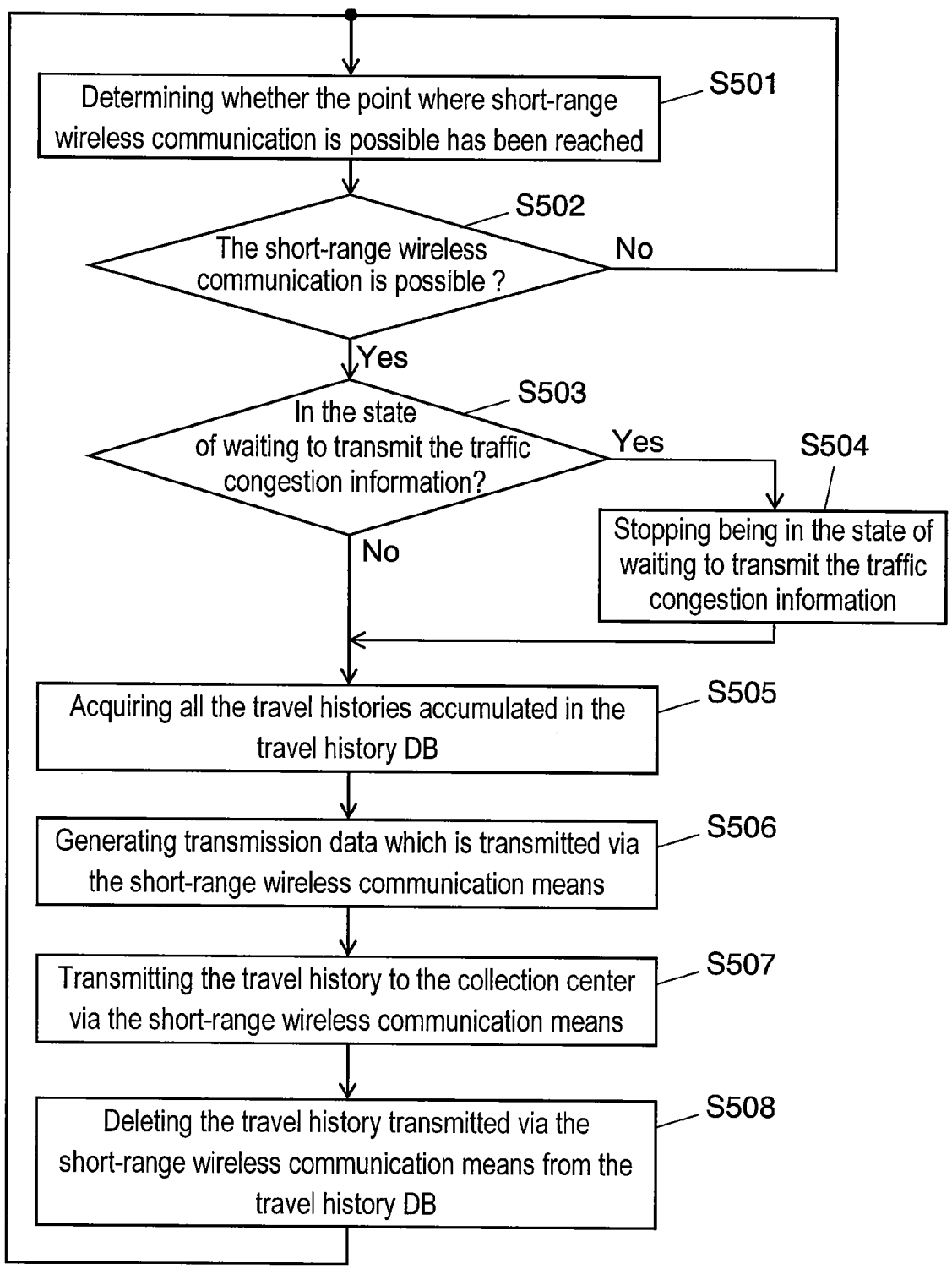
FIG. 5 is a fourth flowchart showing another operation of the travel history collection system of the embodiment of the present invention.

In the state of waiting for short-range wireless communication, as shown in FIG. 5, travel history transmission part 15 always determines whether travel history acquisition terminal device 1 has reached the point where it can perform data communication via short-range wireless communication (S501). When the determination indicates that the short-range wireless communication is impossible ("No" at S502), travel history transmission part 15 performs the determination again (S501). When the short-range wireless communication becomes possible ("Yes" at S502), travel history transmission part 15 determines whether it is in the state of waiting to transmit the traffic congestion information (S503).

When not in the state of waiting to transmit the traffic congestion information ("No" at S503), travel history transmission part 15 immediately executes the subsequent processes (at and after S505). On the other hand, when in the state of waiting to transmit the traffic congestion information ("Yes" at S503), travel history transmission part 15 executes the subsequent processes (at and after S505) after stopping being in the state of waiting to transmit the traffic congestion information (S504).

More specifically, travel history transmission part 15 acquires all the travel histories accumulated in travel history database 13 (S505) and generates transmission data from the acquired travel histories, the transmission data being transmitted via short-range wireless communication means 3 (S506). Travel history transmission part 15 transmits the generated transmission data to travel history collection center device 7 via short-range wireless communication means 3 and road side unit 5 (S507), and deletes the transmitted travel history from travel history database 13 (S508). Again, travel history transmission part 15 determines whether travel history collection terminal device 1 has reached the point where it can perform data communication via short-range wireless communication (S501) and then the aforementioned operations are repeated.

Figure 6:
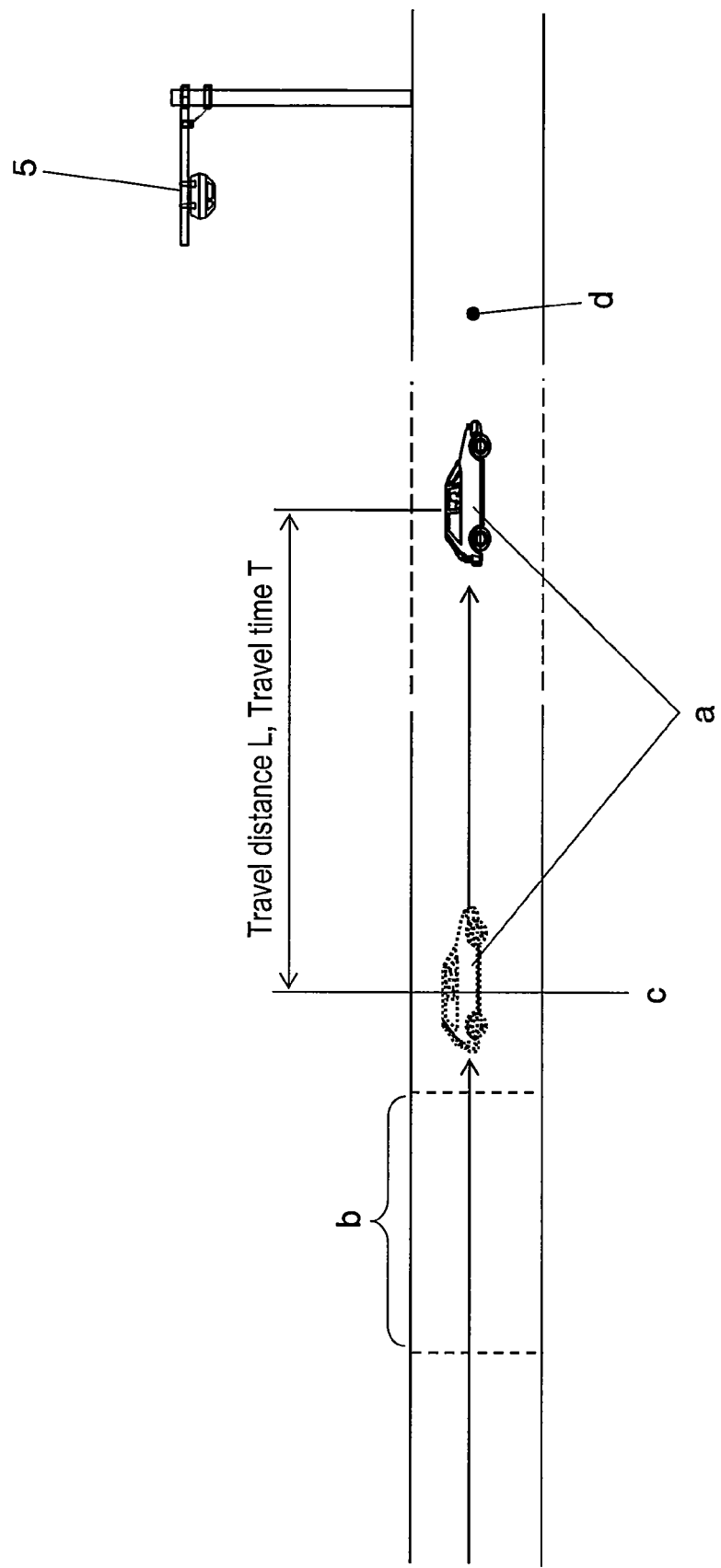
FIG. 6 is a first schematic diagram showing a selection operation of a wireless communication means in the travel history collection system of the embodiment of the present invention.
Figure 7:
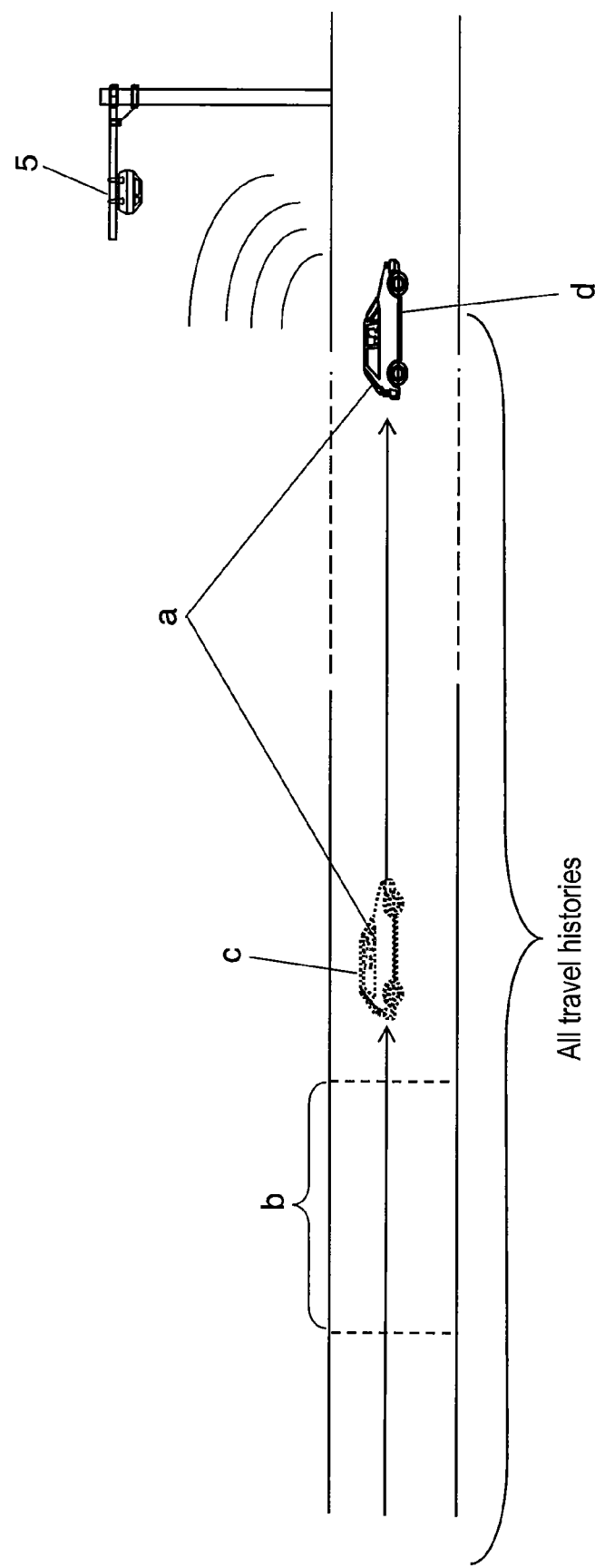
FIG. 7 is a second schematic diagram showing another selection operation of the wireless communication means in the travel history collection system of the embodiment of the present invention.

FIGS. 6 and 7 are diagrams showing selection operations of wireless communication means 3 and 4 in the travel history collection system of the embodiment of the present invention.

In FIG. 6, when a vehicle "a" is detected to have passed through a congestion section "b", the travel distance L and the travel time period T starting from a detected point "c" are calculated. When the vehicle "a" has not reached a point "d" where the vehicle "a" can communicate with road side unit 5 used for short-range wireless communication, the travel distance L and the travel time period T thus calculated are compared with the allowable travel distance Llim and the allowable travel time period Tlim, respectively. When the comparison result indicates that both the travel distance L and the travel time period T are within the allowable values Llim and Tlim, respectively, travel history transmission part 15 continues to be in the state of waiting to transmit the traffic congestion information via wide-range wireless communication means 4. On the other hand, when one or both of them exceed the allowable value Llim or Tlim, travel history transmission part 15 transmits the travel history of the congestion section to travel history collection center device 7 via wide-range wireless communication means 4 mounted on the vehicle "a".

In FIG. 7, the vehicle "a" has reached the point "d" where short-range wireless communication means 3 mounted on the vehicle "a" can communicate with road side unit 5 when the calculated travel distance L and travel time period T do not exceed the allowable values Llim and Tlim. In this case, all the travel histories accumulated in the vehicle "a" including the one corresponding to the congestion section "b" are transmitted to travel history collection center device 7 via short-range wireless communication means 3 mounted on the vehicle "a".

The terms "allowable travel distance Llim and allowable travel time period Tlim indicate a travel distance and a travel time period allowed to determine whether short-range wireless communication means 3 can be used to transmit the vehicle history of the congestion section detected by the vehicle "a" to travel history collection center device 7 before determining to use wide-range wireless communication means 4.

This structure can minimize the delay in transmitting the travel history of the congestion section from travel history acquisition terminal device 1 mounted on the vehicle to travel history collection center device 7.

This structure can also minimize the frequency of using wide-range wireless communication means 4 to transmit the travel history from travel history acquisition terminal device 1 to travel history collection center device 7 even when travel history collection center device 7 collects the travel histories of a large number of travel history acquisition terminal devices 1 all at once. This can reduce the communication load on the wide-range wireless communication network, thereby avoiding convergence.

The determination of the congestion section can be executed as follows.

Figure 8:
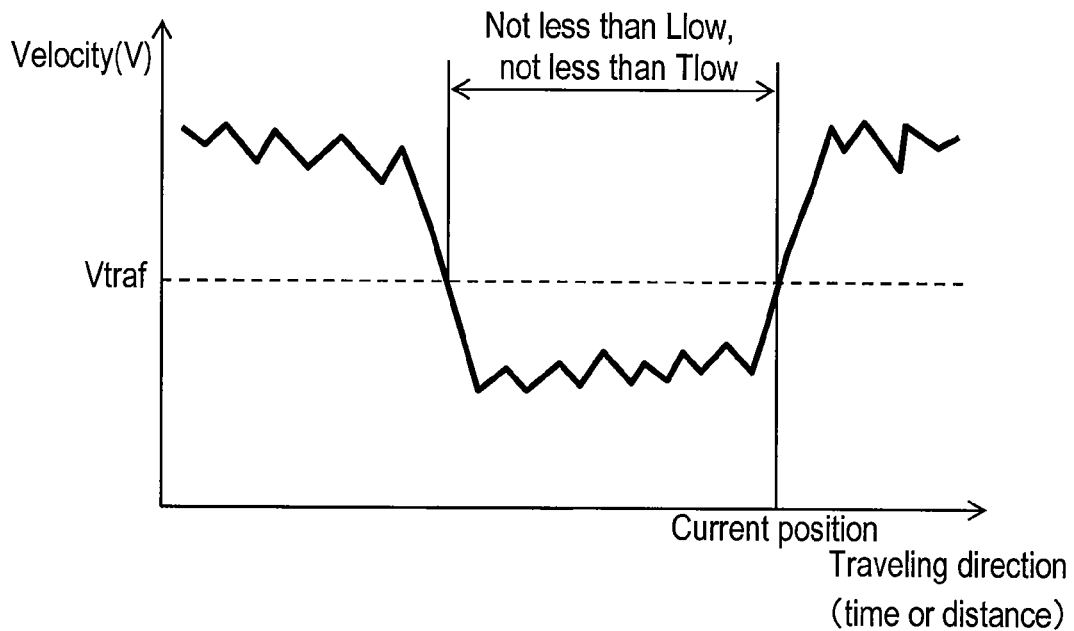
FIG. 8 is a first schematic diagram showing an operation to determine a congestion section in the travel history collection system of the embodiment of the present invention.
Figure 9:
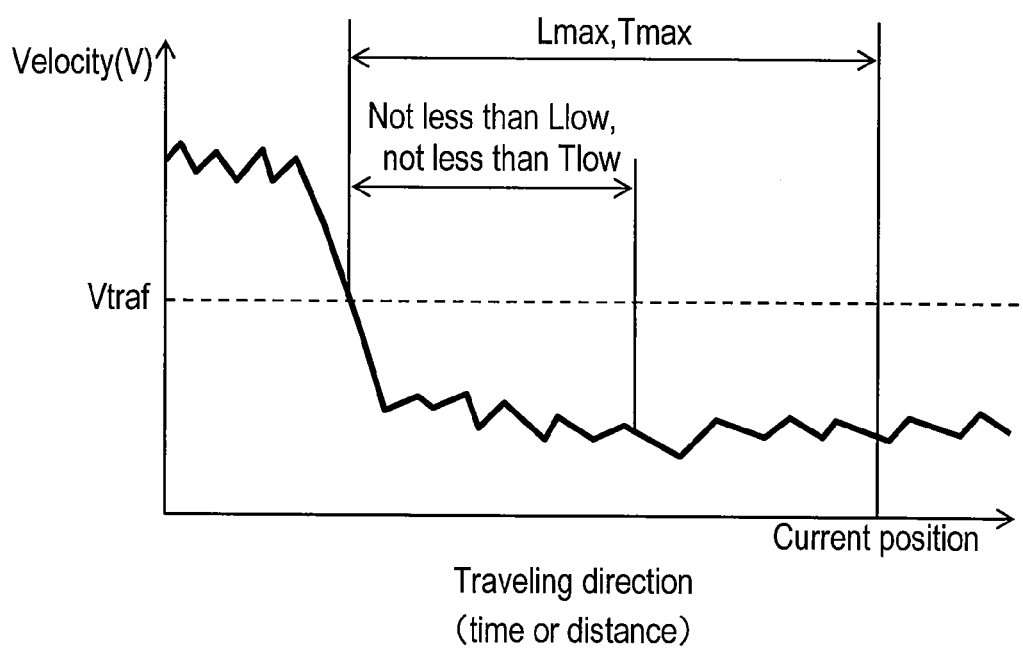
FIG. 9 is a second schematic diagram showing another operation to determine a congestion section in the travel history collection system of the embodiment of the present invention.
Figure 10:
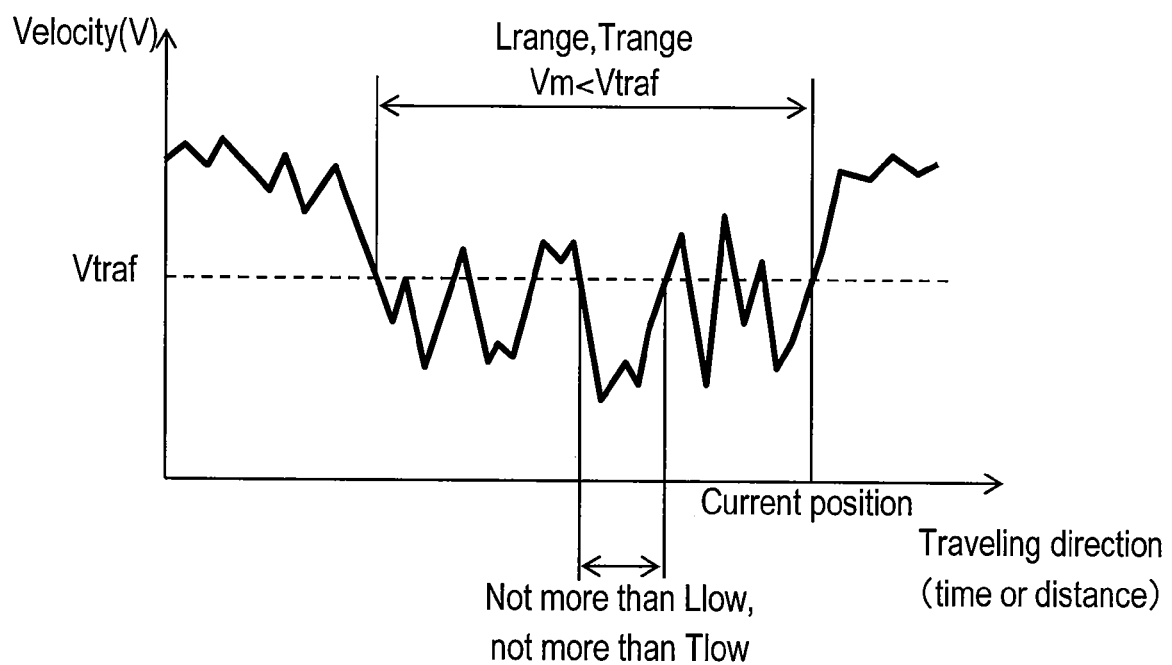
FIG. 10 is a third schematic diagram showing another operation to determine a congestion section in the travel history collection system of the embodiment of the present invention.

FIGS. 8, 9, and 10 are schematic diagrams showing operations to determine a congestion section in the travel history collection system of the embodiment of the present invention.

FIG. 8 shows the calculation of the distance and the time period of a section which starts at the point where the travel velocity "V" of the vehicle reaches a threshold value Vtraf for congestion determination and continues as long as the travel velocity "V" remains equal to or less than the congestion determination threshold value Vtraf. When the travel velocity "V" becomes equal to or more than the congestion determination threshold value Vtraf while the vehicle is not making a right or left turn, if either the distance or the time period of the section with not more than the threshold value Vtraf is equal to or more than a prescribed distance Llow or a prescribed time period Tlow, the section is determined to be a congestion section. When both the distance and the time period of the section with not more than the threshold value Vtraf are equal to or less than the prescribed distance Llow and the prescribed time period Tlow, this section is not determined to be a congestion section.

As shown in FIG. 9, when both the distance and the time period of the section with not more than the threshold value Vtraf exceed the prescribed distance Llow and the prescribed time period Tlow, and either the distance or the time period further exceeds either the allowable distance Lmax or the allowable time period Tmax accumulated in the continually congested section, this section is determined to be a congestion section. At this point in time, the travel history corresponding to the congestion section is transmitted to travel history collection center device 7.

As shown in FIG. 10, when the travel velocity of the vehicle fluctuates around the congestion determination threshold value Vtraf, the approach shown in FIG. 8 cannot be used to accurately determine a congestion section. Therefore, an average velocity Vm of the vehicle is calculated from the travel history in a certain distance Lrange and a certain time period Trange starting from the current position toward the past. When the average velocity Vm is equal to or more than the congestion determination threshold value Vtraf, the travel history corresponding to the certain distance Lrange and the certain time period Trange is not determined to be the travel history of the congestion section. On the other hand, when the average velocity Vm is equal to or less than the congestion determination threshold value Vtraf, the travel history corresponding to the certain distance Lrange and the certain time period Trange is determined to be the travel history of the congestion section.

As a result, a congestion section can be detected from a travel history more accurately depending on the various situations.

INDUSTRIAL APPLICABILITY

As described hereinbefore, the present invention enables a travel history acquired by the terminal device to be transmitted to the center device via a short-range wireless communication means when the short-range wireless communication means can be used, and in the other cases, via the wide-range wireless communication means. Thus, the travel history can be transmitted to the center device even when the short-range wireless communication means cannot be used.

When a travel history is transmitted to the center device, the short-range wireless communication means is used, when it can be used, thereby greatly reducing the communication load on the wide-range wireless communication means. Furthermore, the transmission of the travel history to the center device can be performed at a comparatively early stage and the center device can receive travel histories efficiently, thereby arbitrarily generating accurate traffic information. Thus, the present invention is very useful as a travel history collection system which generates and provides such traffic information.

The invention claimed is:

1. A travel history collection system comprising a terminal side device and a center side device capable of communicating with the terminal side device, wherein
the terminal side device includes:
 A) a vehicle travel history acquisition part for acquiring a travel history of a vehicle;
 B) a congestion section detection part for detecting a congestion section of the vehicle based on the travel history;
 C) a first short-range wireless communication part and a first wide-range wireless communication part for transmitting the travel history containing the congestion section to the center side device,
  C1) the first short-range wireless communication part transmitting the travel history to the center side device via at least one roadside device (C1-R),
  C2) the first wide-range wireless communication part transmitting the travel history to the center side device via a wide-range wireless communication antenna,
  C3) an antenna of the roadside device being closer to the terminal side device than the wide-range wireless communication antenna; and
 D) a travel history transmission part for
  D1) determining whether the travel history can be transmitted to the center side device via the first short-range wireless communication part based on a travel distance and/or a travel time period of the vehicle, and transmitting the travel history to the center side device via:
  D2) the first short-range wireless communication part when the first short-range wireless communication part is within a communication range of the at least one roadside device, and
  D3) the first wide-range wireless communication part
   D3-1) not immediately after the congestion section detection part detects the congestion section
   D3-2) but after the vehicle travels a predetermined distance (Llim) or a predetermined time period (Tlim) after the congestion section detection part detects the congestion section,
   D3-3) when the first short-range wireless communication part is out of the communication range of the at least one roadside device, and
 E) the center side device includes
  E1) a second wide-range wireless communication part and a second short-range wireless communication part for receiving the travel history transmitted from the terminal side device.

2. The travel history collection system of claim 1, wherein when the congestion section detection part detects the congestion section, the travel history transmission part transmits the travel history containing the congestion section to the center side device via one of the first wide-range wireless communication part and the first short-range wireless communication part.

3. The travel history collection system of claim 2, wherein the travel history transmission part transmits the travel history containing the congestion section to the center side device via one of the first wide-range wireless communication part and the first short-range wireless communication part not immediately after the congestion section detection part detects the congestion section but after the vehicle travels the predetermined distance after the congestion section detection part detects the congestion section.

4. The travel history collection system of claim 3, wherein when the congestion section detection part detects the congestion section and then detects another congestion section while waiting for the vehicle to travel the predetermined distance, the travel history transmission part immediately transmits the travel history containing the congestion sections detected so far to the center side device via one of the first wide-range wireless communication part and the first short-range wireless communication part.

5. The travel history collection system of claim 2, wherein the travel history transmission part transmits the travel history containing the congestion section to the center side device via one of the first wide-range wireless communication part and the first short-range wireless communication part not immediately after the congestion section detection part detects the congestion section but after the predetermined time period elapses after the congestion section detection part detects the congestion section.

6. The travel history collection system of claim 5, wherein when the congestion section detection part detects the congestion section and then detects another congestion section while waiting for the predetermined time period to elapse, the travel history transmission part immediately transmits the travel history containing the congestion sections detected so far to the center side device via one of the first wide-range wireless communication part and the first short-range wireless communication part.

7. The travel history collection system of claim 2, wherein the congestion section detection part determines a presence of congestion when a travel velocity of the vehicle remains not more than a predetermined threshold value for one of the predetermined distance and the predetermined time period.

8. The travel history collection system of claim 2, wherein the congestion section detection part determines a presence of congestion when an average travel velocity of the vehicle in one of a certain fixed distance and a certain fixed time period is not more than a predetermined threshold value, even when the travel velocity does not remain not more than the predetermined threshold value for one of the predetermined distance and the predetermined time period, the certain fixed distance and the certain fixed time period being larger than the predetermined distance and the predetermined time period, respectively.

9. The travel history collection system of claim 2, wherein the travel history transmission part transmits the travel history containing the congestion sections detected so far to the center side device via one of the first wide-range wireless communication part and the first short-range wireless communication part immediately after the congestion section reaches a predetermined allowable value.

10. The travel history collection system of claim 2, wherein the travel history transmission part does not transmit the travel history containing the congestion sections detected so far to the center side device immediately after the congestion section reaches a predetermined allowable value, but waits for the travel history to become able to be transmitted via the first short-range wireless communication part and then transmits the travel history to the center side device via the first short-range wireless communication part.

11. The travel history collection system of claim 1, wherein the travel history is transmitted to the center side device via the first short-range wireless communication part when the travel history becomes able to be transmitted to the center side device before the vehicle travels the predetermined distance or the predetermined time period.

12. A terminal side device comprising:
a vehicle travel history acquisition part for acquiring a travel history of a vehicle;
a congestion section detection part for detecting a congestion section of the vehicle based on the travel history;
a first short-range wireless communication part and a first wide-range wireless communication part for transmitting the travel history containing the congestion section to a center side device, the first short-range wireless communication part transmitting the travel history to the center side device via at least one roadside device, the first wide-range wireless communication part transmitting the travel history to the center side device via a wide-range wireless communication antenna, an antenna of the roadside device being closer to the terminal side device than the wide-range wireless communication antenna; and
a travel history transmission part for determining whether the travel history can be transmitted to the center side device via the first short-range wireless communication part based on a travel distance and/or a travel time period of the vehicle, and transmitting the travel history to the center side device via: 1) the first short-range wireless communication part when the first short-range wireless communication part is within a communication range of the at least one roadside device and 2) the first wide-range wireless communication part not immediately after the congestion section detection part detects the congestion section but after the vehicle travels a predetermined distance or a predetermined time period after the congestion section detection part detects the congestion section, when the first short-range wireless communication part is out of the communication range of the at least one roadside device.

13. The terminal side device of claim 12, wherein
when the congestion section detection part detects the congestion section, the travel history transmission part transmits the travel history containing the congestion section to the center side device via one of the first wide-range wireless communication part and the first short-range wireless communication part.

14. The terminal side device of claim 12, wherein the travel history is transmitted to the center side device via the first short-range wireless communication part when the travel history becomes able to be transmitted to the center side device before the vehicle travels the predetermined distance or the predetermined time period.

* * * * *